Feb. 11, 1930.　　　A. V. ROWE　　　1,746,558
ANIMAL FEEDING DEVICE
Filed Oct. 26, 1927
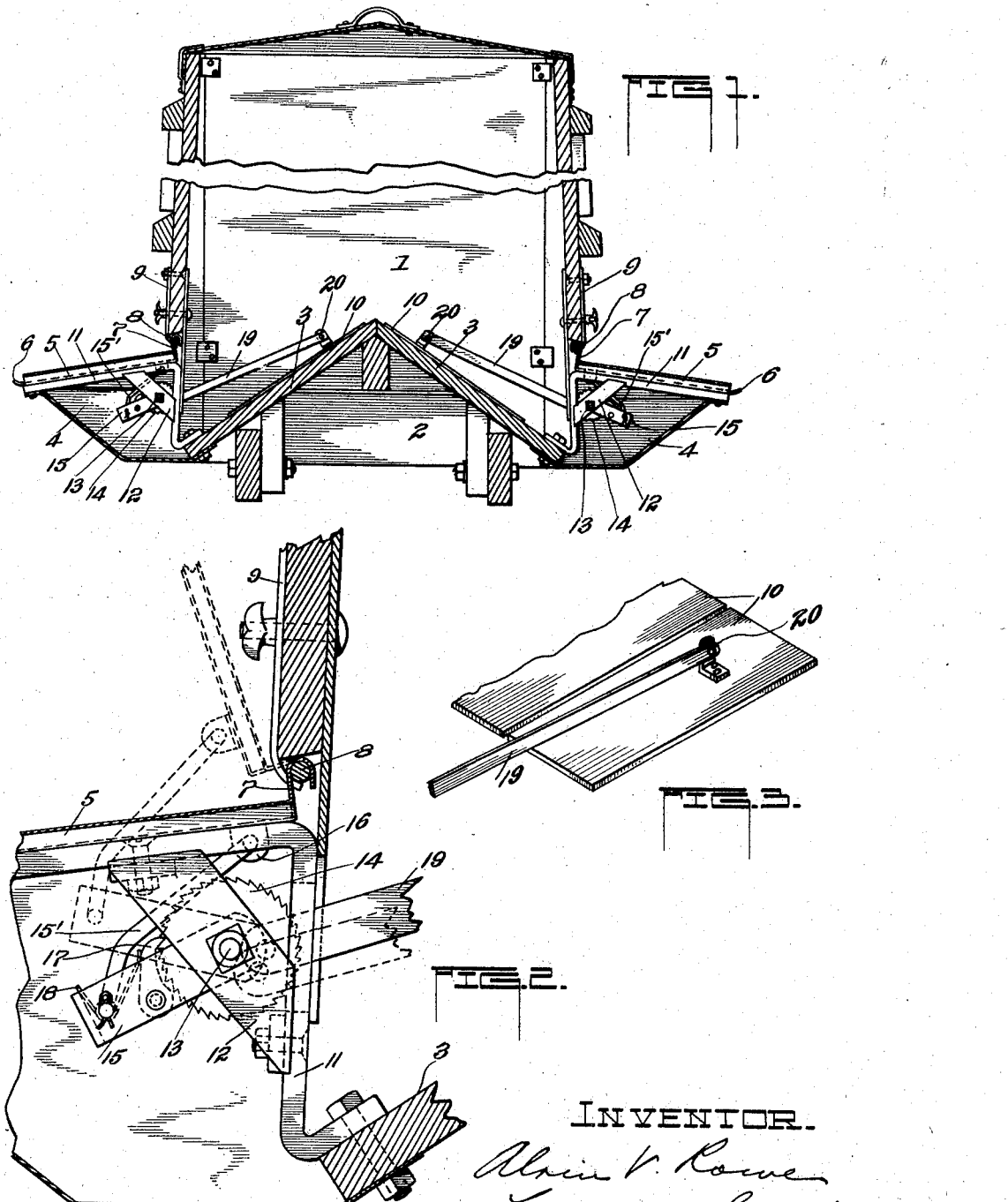

Patented Feb. 11, 1930

1,746,558

UNITED STATES PATENT OFFICE

ALVIN V. ROWE, OF GALESBURG, ILLINOIS

ANIMAL-FEEDING DEVICE

Application filed October 26, 1927. Serial No. 228,795.

This invention has reference to animal feeding devices and it has for its principal object to improve devices of this character which include troughs from which the animals feed and wherein said troughs have cover members hinged for vertical movement, whereby an animal desiring to feed from said troughs may by raising said cover members gain access to the troughs for feeding purposes.

The invention has for its principal object to provide a feeding device in the form of a housing where such feed troughs are in communication therewith and to provide a floor deck for the housing of substantially inverted V shape in cross-section whereby to present oppositely, downwardly and outwardly inclined bottom portions. Furthermore, to provide a plurality of adjacently arranged substantially thin movable supplemental bottom plates superimposed on said floor deck and capable of movement substantially transversely of the housing and floor deck with operating connections therebetween and with certain cover members for the troughs, whereby on the raising of said cover members by an animal said supplemental bottom plates may be moved and in so doing disturb or displace the feed material thereabove and thereon to insure the feed material being dislodged and fed or moved in the direction of the feed troughs to insure a constant supply to the latter.

Other and additional objects will more fully appear from the following description.

That the invention may be more fully understood, reference is had to the accompanying drawing forming a part of the present description and illustrating a preferred embodiment of the invention, in which:—

Fig. 1 is a vertical cross-section through a feeding device embodying my invention, partially broken away;

Fig. 2 is an enlarged detail sectional view showing the arrangement of the supplemental bottom plates for the floor decks and full and dotted line positions of the operating means therefor, and Fig. 3 is a perspective view broken away, to show the adjacent arrangement of said supplemental bottom plates for the floor deck.

Like characters of reference denote corresponding parts throughout the figures.

While I have shown in cross-section in Fig. 1 what constitutes a complete feeding device of the character herein referred to, the description will be directed mainly to the bottom structure of the device, the feeding troughs, the supplemental bottom plates for the floor deck, the cover members for the troughs and the means for imparting movement to said supplemental bottom plates from and through the movement of said cover members.

The feeding device constitutes a housing 1 including the usual end and side walls with the latter arranged in relation to the floor deck of the housing to provide egress openings for the feed material from the housing to the troughs.

The bottom structure for the housing preferably comprises a floor deck 2 of substantially inverted V shape in cross-section to provide the oppositely disposed inclined bottom portions 3 which are inclined downwardly and outwardly from a point midway of the housing to the trough members 4 arranged on either side of the housing, and such inclined bottom portions 3 of the floor deck are disposed at that degree of inclination which will best insure the feed material stored within the housing to find its way by weight of gravity into said trough members 4. I prefer that the side walls of the housing which together with the floor deck provide openings for the feed materials to the troughs shall be disposed at inclinations downwardly and outwardly to give a pyramidal effect to the interior of the housing and thereby further insure a gravitation of the feed material in the direction of the troughs over said inclined portions of the floor deck to said troughs and to prevent arching up and undue packing of the feed material, especially if it should be of that character which would tend to arch and pack.

The troughs 4 open upwardly and are preferably covered by a plurality of adjacently disposed cover members 5 which are arranged at an inclination downwardly and outwardly, having their outer edge portions curved upwardly as at 6 to enable an animal, when it desires to feed, to engage with its snout said portion 6 of the cover plates whereby to raise the same and permit it to have access to the feed material in the troughs and to permit such vertical movement of said cover plates they are provided with the hinged members 7, hinged to the hinge rods 8 supported by straps 9 secured to side walls of the housing.

On each of the inclined portions of the floor deck I arrange superimposed thereon a plurality of adjacently placed substantially thin plate members 10, which in effect constitute supplemental bottom plate members for the floor deck on which the feed material rests and said supplemental bottom plate members are of such transverse width in relation to the inclined bottom portions 3 of the floor deck as to permit the same to have reciprocal movement transversely of said floor deck whereby through such movement to disturb or to displace the feed material thereon and within the housing and insure a gravitation of the feed material over the surfaces of said plates in the direction of and into the trough members. Such movement of these plates is brought about in a manner, which I will now explain, through and by the upward movement of each of the cover members or plates 5. It being understood, although not shown, that a supplemental bottom plate on the floor deck has an operative connection between it and a cover member for the trough. While this arrangement is preferred, it is to be understood that a cover member 5 may or may not have an operative connection with one or more of said supplemental bottom plates.

Bracing bars 11 of angular shape are provided between the inclined portions 3 of the floor deck and a wall of the trough members, for stiffening such last mentioned walls and to provide rests or supports for the cover members 5 of the troughs and also to provide a supporting means for the mechanism which I employ between the cover members and the supplemental bottom plates whereby to impart movement to the latter. Secured to angular portions of the bars 11 are supporting plates 12 and carried by each of said supporting plates is a stem 13 on which is journaled a ratchet toothed wheel 14 and a strap 15 which has a portion lying wholly on one side of said wheel and with a turned back portion lying partially on the other side of said wheel, best seen in Fig. 2. To the outer end of this strap is pivotally connected a rod 15' which at its other end has a pivotal connection with a hanger 16 secured to the upper and inner and underside of a cover member or plate 5. Also pivotally connected with said strap is a ratchet pawl 17 adapted to have a ratchet tooth connection with the teeth of the ratchet wheel, whereby to impart an intermittent rotative movement to said wheel with each raising movement of the cover member or plate 5. The pawl is yieldingly held in operative engagement with the ratchet wheel and to slide back thereon, with each lowering movement of the cover member or plate 5, by means of a spring plate 18 connected with the pivot of the rod 15', at the strap 15. To the ratchet wheel is pivotally connected a pitman bar 19, which has a crank-like movement with each rotative movement of the ratchet wheel and said bar 19 passes into the feeder proper and at its inner end has a pivotal connection at 20, with a supplemental bottom plate 10, see Figures 1 and 3. It should now be apparent that with feed material lying on and being disposed above the said plates 10 that as the bars 19 are reciprocated forward and backward that such plates will keep the feed material in a state of agitation or will so disturb and displace the same as to insure its delivery from the feeder to said trough or troughs and insure a constant supply of such feed material to said troughs.

What I claim is:—

1. In an animal feeding device, in combination, a housing including side walls and a floor deck of oppositely inclined portions in the form of an inverted V, said side walls having feed openings, troughs arranged longitudinally of the side walls in communication with the housing, a plurality of adjacently arranged cover plates for said troughs hinged for movement in a vertical plane, a plurality of adjacently positioned plates superimposed on said floor deck providing movable bottom portions for said housing and arranged for reciprocation on said floor deck, and operating connections between certain of said cover plates and certain of said movable bottom plates adapted during the raising of said cover plates to reciprocate said movable bottom plates.

2. In an animal feeding device, in combination, a housing having an inverted V-shaped floor deck, a feed trough alongside the same and in communication therewith, a plurality of cover plates for said trough hinged for movement in a vertical plane, a plurality of feed displacing and disturbing plate members supported for endwise movement in a vertical plane over the surface of the deck of said housing, operating means for each of said members, connections between each said operating means and each said members, and connections between each said cover member and each said operating means.

3. In an animal feeding device, in combination, a housing having a downwardly and outwardly inclined floor deck, a trough outside said housing and in communication therewith, a cover member for said trough hinged for movement in a vertical plane, a plate supported for reciprocal movement on said inclined floor deck, a ratchet wheel, an operating connection between said ratchet wheel and said plate, and a pawl operatively connected with said cover member to actuate said wheel when said cover member is raised.

4. In an animal feeding device, a housing having an inclined floor deck, a feed trough, a supplemental bottom member for said floor deck having a surface movement lengthwise of itself and in a vertical plane on said deck, a member having movement relative to said trough and arranged for such movement by the engagement of an animal therewith, and operating connections between said supplemental bottom member and said last mentioned member.

5. In an animal feeding device, in combination, a housing provided with a floor deck having a downwardly and outwardly inclined surface, a trough outside said housing and in communication therewith, a cover member for said trough hinged for movement in a vertical plane, a feed displacing member supported for a surface sliding relation on said deck, an operating means within the trough, means movable with the cover member to actuate said operating means, and means operated by the operating means for alternately sliding said feed displacing member in opposite directions on said deck.

In witness whereof, I have hereunto affixed my hand this 17th day of October, 1927.

ALVIN V. ROWE.